United States Patent [19]

Sanftleben et al.

[11] 4,415,363
[45] Nov. 15, 1983

[54] SINTERED IRON BASE FRICTION MATERIAL

[75] Inventors: Keith E. Sanftleben; Walter R. Tarr, both of Troy, N.Y.

[73] Assignee: The Bendix Corporation, Southfield, Mich.

[21] Appl. No.: 374,225

[22] Filed: May 3, 1982

[51] Int. Cl.³ .................. B22F 1/00; C22C 33/02; F16D 69/02
[52] U.S. Cl. ........................ 75/229; 75/231; 75/234; 75/235; 75/243; 75/246; 75/252; 428/549; 428/550; 428/559; 428/564; 428/566; 188/251 A; 188/251 M
[58] Field of Search .............. 428/549, 550, 559, 564, 428/566; 75/229, 231, 243, 246, 252, 234, 235; 188/251 A, 251 M

[56] References Cited

U.S. PATENT DOCUMENTS

| | | | |
|---|---|---|---|
| 2,863,211 | 11/1955 | Wellman | 428/564 |
| 2,885,379 | 5/1959 | Taylor et al. | 188/251 M |
| 2,886,882 | 5/1959 | Cox | 75/243 |
| 2,945,291 | 7/1960 | Ankeny et al. | 428/564 |
| 2,945,292 | 7/1960 | Lutner, Jr. et al. | 428/564 |
| 3,069,758 | 12/1962 | Wulff | 75/229 X |
| 3,114,197 | 12/1963 | DuBois et al. | 75/229 |
| 3,306,715 | 2/1967 | Schlomer et al. | 75/231 X |
| 3,434,998 | 3/1969 | Aldrich et al. | 188/251 M |
| 3,835,118 | 9/1974 | Rhee et al. | |
| 3,853,572 | 12/1974 | Herron et al. | 75/243 X |
| 3,891,398 | 6/1975 | Odier | 75/231 X |
| 4,050,619 | 9/1977 | Tarr | |
| 4,119,591 | 10/1978 | Aldrich | 188/251 A X |
| 4,311,524 | 1/1982 | Genkin et al. | 188/251 A X |
| 4,350,530 | 9/1982 | Kamioka | 75/231 |

FOREIGN PATENT DOCUMENTS

| | | | |
|---|---|---|---|
| 215160 | 5/1958 | Australia | 428/566 |
| 1205708 | 7/1958 | Fed. Rep. of Germany | 428/564 |

Primary Examiner—Benjamin R. Padgett
Assistant Examiner—Matthew A. Thexton
Attorney, Agent, or Firm—Leo H. McCormick, Jr.; Ken C. Decker

[57] ABSTRACT

A composition of material for use as a friction lining with a cast iron mating surface. The friction lining has an iron powder base that reacts with tin to alloy and hold substantially equal weight percentages of graphite and coke in a fixed position. The friction lining has a substantially constant wear rate up to 300° C. and a linear wear rate between 300°–500° C.

10 Claims, 15 Drawing Figures

SINTERED FRICTION MATERIAL COMPOSITION

| INGREDIENTS WEIGHT % | X | A | B | C | D | E | F | G | H | I | J | K | L | M | N | O | P | Q |
|---|---|---|---|---|---|---|---|---|---|---|---|---|---|---|---|---|---|---|
| IRON | 53 | 79 | 72 | 85 | 81 | 80 | 77 | 75 | 84 | 75 | 78 | 78 | 78 | 77 | 76 | 74 | 69 | 60 |
| COPPER | | | | | | | | | | | | | | | | | | 19 |
| GRAPHITE | 18 | 7 | 14 | 3 | 8 | 7 | 7 | 7 | 8 | 7 | 7 | 7 | 7 | 7 | 7 | 7 | 7 | 7 |
| COKE | | 8 | 8 | 7 | 8 | 8 | 8 | 8 | 2 | 12 | 8 | 8 | 8 | 8 | 8 | 8 | 8 | 8 |
| TIN | | 6 | 6 | 5 | 3 | 5 | 8 | 10 | 6 | 6 | 6 | 5 | 6 | 6 | 6 | 6 | 6 | 6 |
| MoS2 | | | | | | | | | | | | 1 | 2 | | | | | |
| CERAMIC POWDER | 3 | | | | | | | | | | | | | 1 | 2 | 3 | | |
| STEEL FIBER | 10 | | | | | | | | | | | | | | | | 5 | 10 | |
| RUBBER | 2 | | | | | | | | | | | | | | | | | | |
| RESIN | 7 | | | | | | | | | | | | | | | | | | |
| BaSo4 | 7 | | | | | | | | | | | | | | | | | | |

| SINTERED FRICTION MATERIAL COMPOSITION ||||||||||||||||||
|---|---|---|---|---|---|---|---|---|---|---|---|---|---|---|---|---|---|
| INGREDIENTS WEIGHT % | X | A | B | C | D | E | F | G | H | I | J | K | L | M | N | O | P | Q |
| IRON | 53 | 79 | 72 | 85 | 81 | 80 | 77 | 75 | 84 | 75 | 78 | 78 | 78 | 77 | 76 | 74 | 69 | 60 |
| COPPER | | | | | | | | | | | | | | | | | | 19 |
| GRAPHITE | 18 | 7 | 14 | 3 | 8 | 7 | 7 | 7 | 8 | 7 | 7 | 7 | 7 | 7 | 7 | 7 | 7 | 7 |
| COKE | | 8 | 8 | 7 | 8 | 8 | 8 | 8 | 2 | 12 | 8 | 8 | 8 | 8 | 8 | 8 | 8 | 8 |
| TIN | | 6 | 6 | 5 | 3 | 5 | 8 | 10 | 6 | 6 | 6 | 5 | 6 | 6 | 6 | 6 | 6 | 6 |
| MoS2 | | | | | | | | | | | 1 | 2 | | | | | | |
| CERAMIC POWDER | 3 | | | | | | | | | | | | 1 | 2 | 3 | | | |
| STEEL FIBER | 10 | | | | | | | | | | | | | | | 5 | 10 | |
| RUBBER | 2 | | | | | | | | | | | | | | | | | |
| RESIN | 7 | | | | | | | | | | | | | | | | | |
| BaSo4 | 7 | | | | | | | | | | | | | | | | | |
FIG. 1
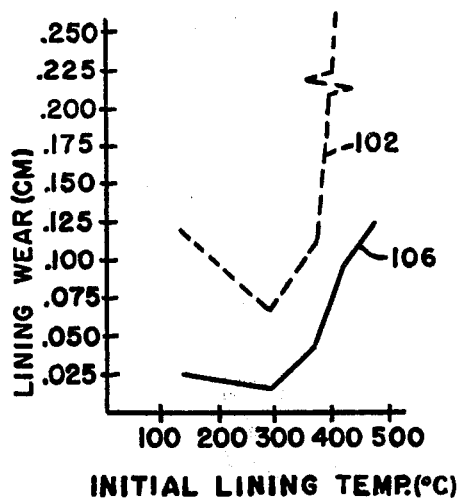
FIG. 2
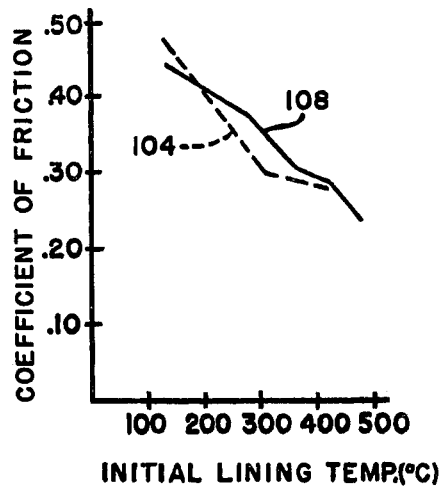
FIG. 3

SINTERED IRON BASE FRICTION MATERIAL

BACKGROUND OF THE INVENTION

This invention relates to a sintered iron base friction material having a substantially constant wear rate up to 300° C. and a substantially linear wear rate between 300°–500° C.

In recent years, disc brakes on automobiles have had to be able to operate under severe braking conditions in order to meet certain standards. During braking, such disc brakes have been subjected to operating temperatures that often exceed 300° C. When organic brake linings operate at temperatures above 300° C., as exponential wear rate is experienced and such linings have burst into flames resulting in a dangerous condition.

Even the most successful organic based friction linings of the type disclosed in U.S. Pat. No. 3,835,118, which use sponge iron as the principal friction modifier cannot operate above 300° C. for an extended period of time without the resin matrix deteriorating.

It is known in the aerospace industry that sintered materials can be used as friction lining for aircraft brakes. As disclosed in U.S. Pat. No. 3,019,514, the matrix material is normally copper. Unforturnately for most automobile applications, the cost of copper renders such a friction lining too expensive for most customers.

U.S. Pat. No. 4,050,619 discloses substitution of iron powder for copper powder. However, since copper powder has a lower melting point and alloys with the fusible material at a lower temperature and/or impact pressure, iron powder has not been extensively investigated as the matrix material for production.

SUMMARY OF THE INVENTION

The composition of material of this invention is characterized by a sintered iron base friction material that is compatible with a cast iron mating member. The friction material consists of a mixture of from 72-85% by weight of iron powder, 3-14% by weight of graphite, 2-12% by weight of coke and 3-10% by weight of tin. A measured portion of the mixture was placed in a mold and a compressive force of about 4200 Kg/Cm$^2$ applied thereto to preform the mixture into a desired shape of a brake pad. This preformed brake pad was conveyed to an oven having a temperature of between 700°–1100° C. The temperature in the oven causes the tin and iron to alloy and form a matrix for holding the graphite and coke in a fixed relationship to product the sintered friction member. On removal from the oven, the sintered friction member was transferred to a press where a force about 4200 Kg/Cm$^2$ was applied to achieve a desired density to produce a specific friction lining. Thereafter, the friction lining is ground to produce a desired thickness.

An advantageous effect from using this composition of material as a friction lining is achieved through the predictable, substantially uniform and constant wear rate that occurs as long as the frictional generated temperature is below 300° C. and substantially linear wear rate that occurs when the temperature is between 300°–500° C.

A further advantage of this composition of material when used as a friction lining occurs in its compatibility with a cast iron mating member by possessing predictable operation characteristics since the rate of wear is substantially constant when operated at a temperature below 300° C. and substantially linear when operated at temperatures between 300°14 500° C.

It is therefore an object of this invention to provide a sintered friction lining with a composition comprising substantially equal amounts of graphite and coke held in a matrix of alloyed iron and tin having an operational characteristic wherein the rate of wear when engaging a cast iron member is substantially constant in an operating range up to 300° C.

These advantages and objects should be apparent from reading the specification while viewing the accompanying drawings.

BRIEF DESCRIPTION OF THE DRAWINGS

FIG. 1 is a table illustrating various compositions of materials made according to this invention.

FIGS. 2 and 3 of the drawings are graphs comparing a friction lining made according to this invention with a prior art friction lining.

DETAILED DESCRIPTION OF THE INVENTION

Figure 4:
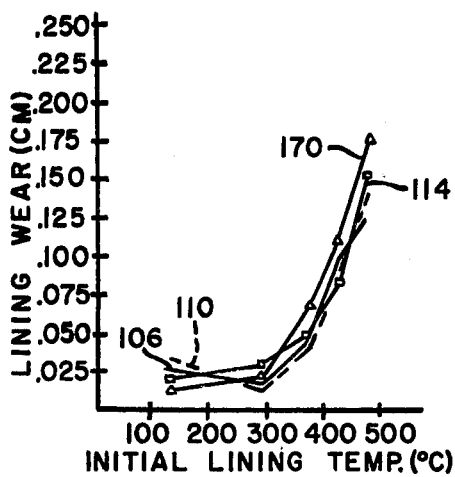
FIGS. 4–15 of the drawings are graphs comparing the changes that occur in the wear rate and the coefficient of friction with changes in the composition of material in the invention.

When a vehicle is moving down a long incline as often happens in a mountain terrain, it is often necessary to momentarily apply the brakes. In applying the brakes, brake lining in each wheel frictionally engages a drum or rotor normally made of cast iron to reduce the rotary motion of the wheels. Upon frictional engagement, thermal energy is produced as the drum or rotor slides on the friction lining. As thermal energy in the brake lining and drum or rotor increases, a corresponding decrease in friction results. With a decrease in friction, the effort required to stop a vehicle correspondingly increased. When the operating temperature of friction lining increases, the wear rate of the friction lining also increased. The composition of material disclosed herein by this invention provides for a substantially constant wear rate in the normal operating range of a friction lining and a linear wear rate in the transitional operating range occasionally experienced.

In order to compare the composition of material of this invention with a typical friction lining of the type disclosed in U.S. Pat. No. 3,835,118, samples of friction lining were made and tested on a dynamometer.

In evaluating lining wear, 200 stops were made at each temperature to observe the effect on the lining. The stops simulated the stopping of a vehicle traveling 80 to 0 Km/hr. with a deceleration rate of 0.34 g. At the end of each 200 stop segment, the samples were weighed and measured to assess lining wear.

A sample of a composition X containing the ingredients set forth in the table of FIG. 1 was made into a brake pad in a manner disclosed in U.S. Pat. No. 3,835,118. This brake pad was placed on the dynamometer and the wear test outlined above carried out. This composition X had a lining wear illustrated by curve 102 in FIG. 2 and a coefficient of friction illustrated by curve 104 in FIG. 3. As curve 102 illustrates the wear rate for composition X would be acceptable for most vehicle applications as long as the operating temperature remains below 300° C. Between 300°–400° C., the wear rate of composition accelerates in an exponential manner. Since some type vehicles experience operating temperatures above 400° C., composition X would not be an adequate brake lining due to excessive wear.

Since it was known that sintered brake lining could operate at temperatures above 500° C., it was decided to evaluate a sintered brake lining for an automobile. Due to the cost of copper powder, it was decided to substitute iron powder as the base ingredient. Initial substitution into a typical sintered composition did not provide an acceptable friction lining due to rotor wear, noise and high coefficient of friction. Only after a portion of graphite in the typical composition was replaced by coke was an acceptable friction lining produced. Our experiments indicate that an optimum sintered brake lining with an iron-tin alloy matrix is achieved when substantially equal amounts of graphite and coke are present in the composition of material. This composition of material, which is identified as composition A in FIG. 1, was produced in the following manner.

Ingredients listed in FIG. 1 for composition A were placed in a blender and agitated until a homogeneous mixture was achieved. A measured portion of the mixture was placed in a mold and a compressive force of 4200 Kg/Cm$^2$ applied to establish a preformed shape for the friction lining. The preformed friction lining was placed in an oven having a temperature of 1025° C. for a time period of 30 minutes.

This oven temperature oven is not high enough to create a reaction between either the graphite or coke and iron, however, the tin and iron powder do alloy to create a matrix for holding the graphite and coke in a substantially fixed position. The sintered friction lining was transferred to press where a force of 4200 Kg/Cm$^2$ was applied to establish a set density for the friction lining. The lining was then ground to a final thickness.

As with the friction lining made from composition X, the friction lining made from composition A was tested on a dynamometer for the various temperatures. At the end of each 200 stop temperature sequence, the lining was weighed and the thickness measured. The rate of wear of composition A is illustrated by curve 106 of FIG. 2 and the coefficient of friction is illustrated by curve 108 of FIG. 3.

Curvet 106 clearly illustrates that the wear rate for composition A is substantially uniform up to 300° C. and increases at a linear wear rate from 300°–500° C. While the friction lining of composition A could operate above 500° C., the remaining components in automotive brakes such as rubber seal, brake fluid and brake actuating components are not designed to operate for any sustained time period above 500° C., thus, the operational characteristics of composition A were not investigated above 500° C. As should be evident from FIG. 2, composition A clearly provides an improvement in the rate of wear over composition X.

In order to compare the effect of changes in the ingredients in composition A several other compositions were evaluated by utilizing the same manufacturing and dynamometer evaluation methods.

In compositions B and C listed in FIG. 1, the iron powder was replaced with a corresponding amount in the graphite. The measured rate of wear and the coefficient of friction for composition B is illustrated by curves 110 and 112 respectively in FIGS. 4 and 5. The measured rate of wear and the coefficient of friction for composition C is illustrated by curves 114 and 116, respectively, in FIGS. 4 and 5. While the rate of wear and coefficient of friction for compositions B and C are substantially equal to composition A, the upper limit of 85% by weight for iron powder in composition C is such that the rate of wear from 400° to 500° C. is approaching an exponential rate rather than the substantially linear achieved by composition A. Similarly in composition B, where a lower limit of 72% by weight for iron powder is evaluated, the structural strength of the alloy matrix friction lining may not be adequate for some applications since the graphite and coke are not part of the alloy matrix. From these tests, we believe that the optimum iron powder content should be about 79% by weight with a range for certain applications extending from 72–85% by weight.

The strength of the matrix of composition A is dependent on the fuseability of iron powder and tin in response to temperature.

In order to evaluate the matrix, compositions D, E, F and G listed in FIG. 1 were made into brake linings in the same manner as composition A.

Figure 6:
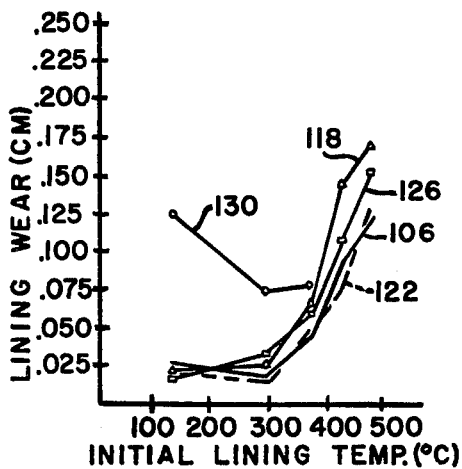
Figure 7:
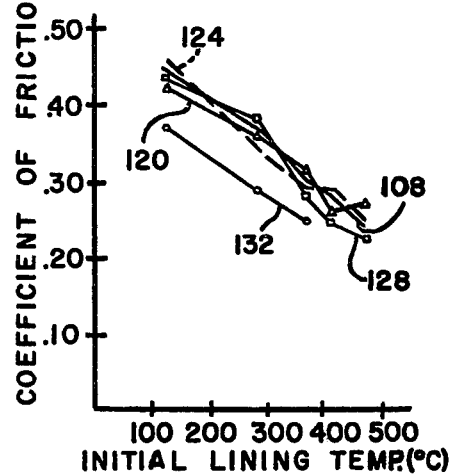

The rate of wear and coefficient of friction for composition D, which has the least amount of tin, is illustrated by curves 118 and 120 in FIGS. 6 and 7, respectively.

The rate of wear and coefficient of friction for composition E is illustrated by curves 122 and 124 in FIGS. 6 and 7, respectively. Since composition E is within 1 weight percent of composition A, it is not surprising that the rate of wear and coefficient of friction are substantially identical.

The rate of wear and coefficient of friction of composition F is illustrated by curves 126 and 128 in FIGS. 6 and 7, respectively.

The rate of wear and coefficient of friction of composition G is illustrated by curves 130 and 132 in FIGS. 6 and 7, respectively.

As evidenced by curves 118, 122, 126 and 130 shown in FIG. 6, both an increase and decrease in the weight percentage of tin from the optimum set forth in composition A cause a corresponding increase in the wear rate of a sintered friction lining.

Having already determined the effect of changes in the sintered friction material through the substitution of graphite for the iron powder, a series of tests were conducted to see if changes in coke would cause similar characteristics in the wear rate and coefficient of friction. Compositions H and I listed in FIG. 1 were made into a friction lining in a manner as taught with composition A. When tested on the dynamometer, composition H had a wear rate illustrated by curve 134 in FIG. 8 and a coefficient of friction illustrated by curve 136 in FIG. 9 and composition I had a wear rate illustrated by curve 138 and a coefficient of friction illustrated by curve 140.

Figure 8:
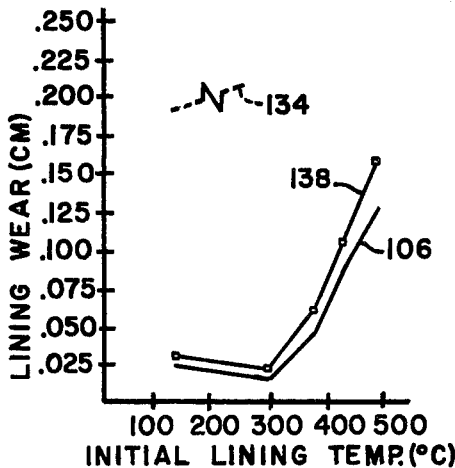
Figure 9:
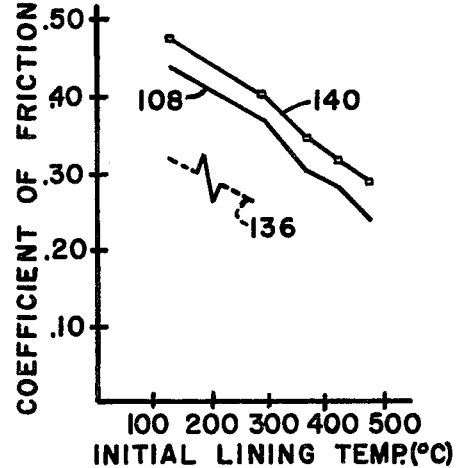

From viewing FIG. 8, it should be evident that coke is an essential ingredient in this type sintered material. The wear rate of composition H is unacceptable for use as a brake lining. As with tin, once the optimum weight percentage of coke is reached as in composition A, both a decrease and increase in coke cause the wear rate to increase. The change in wear rate of the friction lining with an increase in coke such as in composition I would not appear as critical as when a correspondingly decrease occurs. However, the structural integrity or strength of a friction lining is decreased with an increase in coke.

The coefficient of friction for composition A may be too high for some brake systems. In an effort to reduce the coefficient of friction, a lubricant, molybdenum disulfide, was substituted for the iron powder in composition A to produce compositions J and K listed in FIG. 1.

Figure 10:
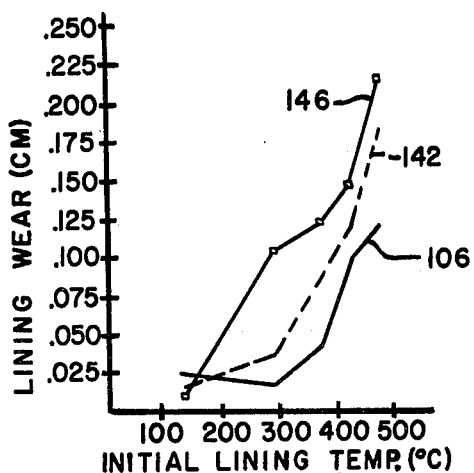
Figure 11:
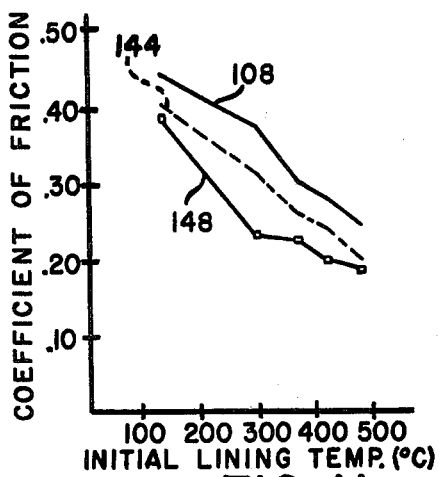

The friction lining made from composition J had a wear rate illustrated by curve 142 in FIG. 10 and a coefficient of friction illustrated by curve 144 in FIG. 11.

The friction lining made from composition K had a wear rate illustrated by curve 146 in FIG. 10 and a coefficient of friction illustrated by curve 148 in FIG. 11.

As illustrated in FIG. 11, the coefficient of friction of composition A was reduced through the use of the molybdenum disulfide, a lubricant, however, the wear rate also increased as shown in FIG. 10. It would appear the maximum amount of lubricant added to composition A should be less than 2% by weight in order that the wear rate is not adversely effected when the sintered material is used as a friction lining.

For some brake applications, a higher coefficient of friction than exhibited by composition A may be desirable, therefore, a friction producer, ceramic material (mullite, kyanite or silica) was substituted for the iron powder to produce compositions L, M and N listed in FIG. 1.

Figure 12:
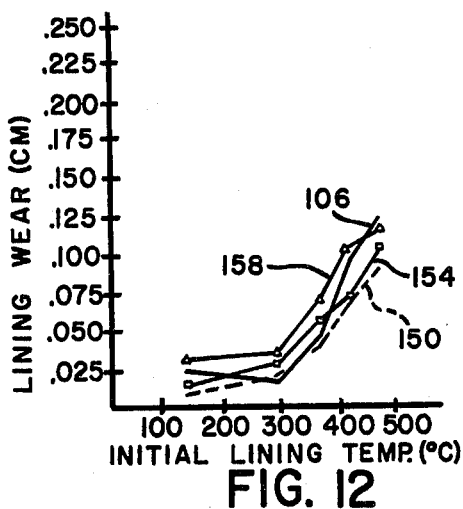
Figure 13:
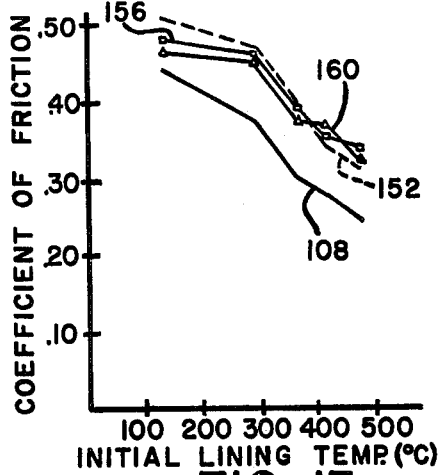

Composition L had a wear rate illustrated by curve 150 in FIG. 12 and a coefficient of friction illustrated by curve 152 in FIG. 13.

Composition M had a wear rate illustrated by curve 154 in FIG. 12 and a coefficient of friction illustrated by curve 156 in FIG. 13.

Composition N had a wear rate illustrated by curve 158 and a coefficient of friction illustrated by curve 160.

As shown in FIG. 13, the coefficient of friction was increased through the addition of a ceramic member and the wear rate as shown in FIG. 12 is acceptable. However, noise and/or rotor wear was increased with the addition of the ceramic material to the composition.

The structural unity of the brake lining produced from composition A is controlled by the coalescence of materials resulting from alloying and densification. In an effort to increase the structural unity, composition A was modified through the substitution of steel fibers for a portion of the iron powder to produce compositions O and P listed in FIG. 1.

Figure 14:
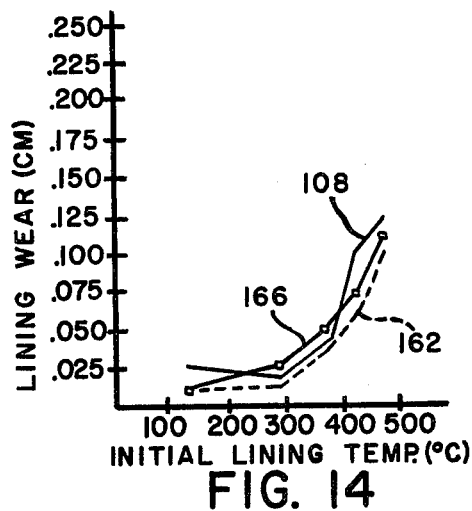
Figure 15:
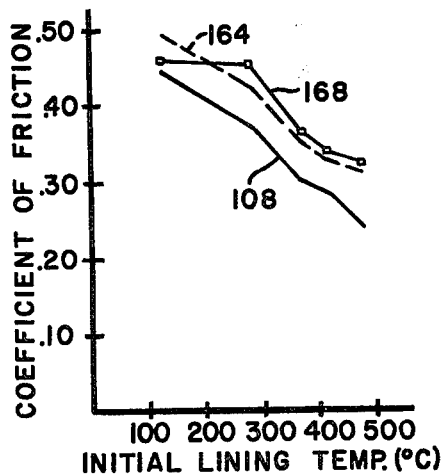

A brake lining made from composition O, when tested on the dynamometer had a wear rate illustrated by curve 162 in FIG. 14 and a coefficient of friction illustrated by curve 164 in FIG. 15.

A brake lining made from composition P, when tested on the dynamometer had a wear rate illustrated by curve 166 in FIG. 14, and a coefficient of friction illustrated by curve 168 in FIG. 15.

While both compositions O and P, when used as a brake lining had acceptable rates of wear and coefficient of friction, the manufacture of the composition required more attention to achieve a uniform mixture. The increase in manufacturing cost may not justify the addition of steel fiber to composition A for most applications.

Since sintered friction lining normally uses copper as the base material, a portion of the iron powder of composition A was replaced with copper powder to produce composition Q listed in FIG. 1. In composition Q, both the iron and copper powders react with tin to produce the matrix for holding the graphite and coke.

Figure 5:
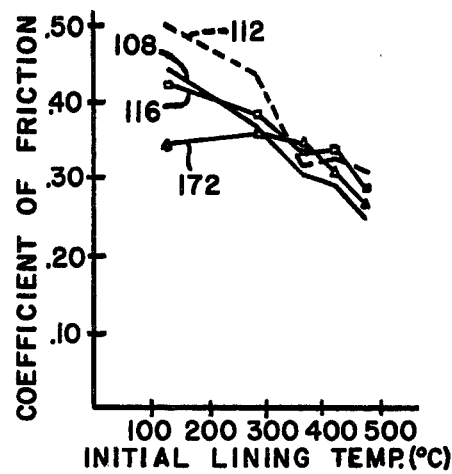

A brake lining made from composition Q, when tested on the dynamometer, had a wear rate illustrated by curve 170 in FIG. 4 and a coefficient of friction illustrated by curve 172 in FIG. 5. While both the rate of wear and coefficient of friction for composition Q are acceptable, the cost of the copper powder, when compared with iron powder, may make composition Q unacceptable for use as a friction lining on an automobile.

We claim:
1. A sintered iron base friction material consisting of:
   72-85% by weight of a base material selected from a group consisting of iron, and a mixture of iron and copper powders;
   3-14% by weight of graphite;
   2-12% by weight of coke;
   0-3% by weight of friction modifiers; and
   3-10% by weight of low melting material selected from a group consisting of zinc, bismuth, lead and tin, said low melting material alloying with said base material to develop a matrix that holds said friction modifiers, graphite and coke in a substantially fixed relationship to produce said friction member, said friction member on engagement with a corresponding mating member generating thermal energy, said friction member having a substantially constant wear rate when the generated temperature is below 300° C. and a substantially linear wear rate above 300° C.

2. The sintered iron base friction material, as recited in claim 1 wherein said base material is iron powder.

3. The sintered iron base friction material as recited in claim 2 wherein said low melting material is tin.

4. The sintered iron base friction material as recited in claim 3 wherein said friction material includes silica.

5. The sintered iron base friction material as recited in claim 4 wherein said friction material includes up to 2% by weight of molybdenum disulfide as a friction modifier.

6. The sintered iron base friction material as recited in claim 1 wherein steel fiber replaces iron and represents up to 10% by weight of said friction material.

7. The sintered iron base friction material as recited in claim 1 wherein said base material includes at least 60% by weight of iron and up to 19% by weight of copper.

8. A composition of material for use as a friction member that engages a cast iron mating surface, said friction member consisting of a mixture of:
   72-85% by weight of iron powder;
   3-14% by weight of graphite;
   2-12% by weight of coke; and
   3-10% of tin, said iron powder and tin alloying together in response to temperature to form a matrix that holds the graphite and coke in a fixed relationship to produce said friction member, said friction member on engagement with said cast iron mating surface exhibiting a substantially constant wear rate as long as the generated temperature is below 300° C. and a substantially linear wear rate when the generated temperature is between 300°-500° C.

9. The composition of material as recited in claim 8 wherein said friction member has substantially equal amounts of graphite and coke.

10. The composition of material as recited in claim 9 wherein said friction member wherein the ratio of iron powder to tin is about 12 to 1.

* * * * *